United States Patent Office.

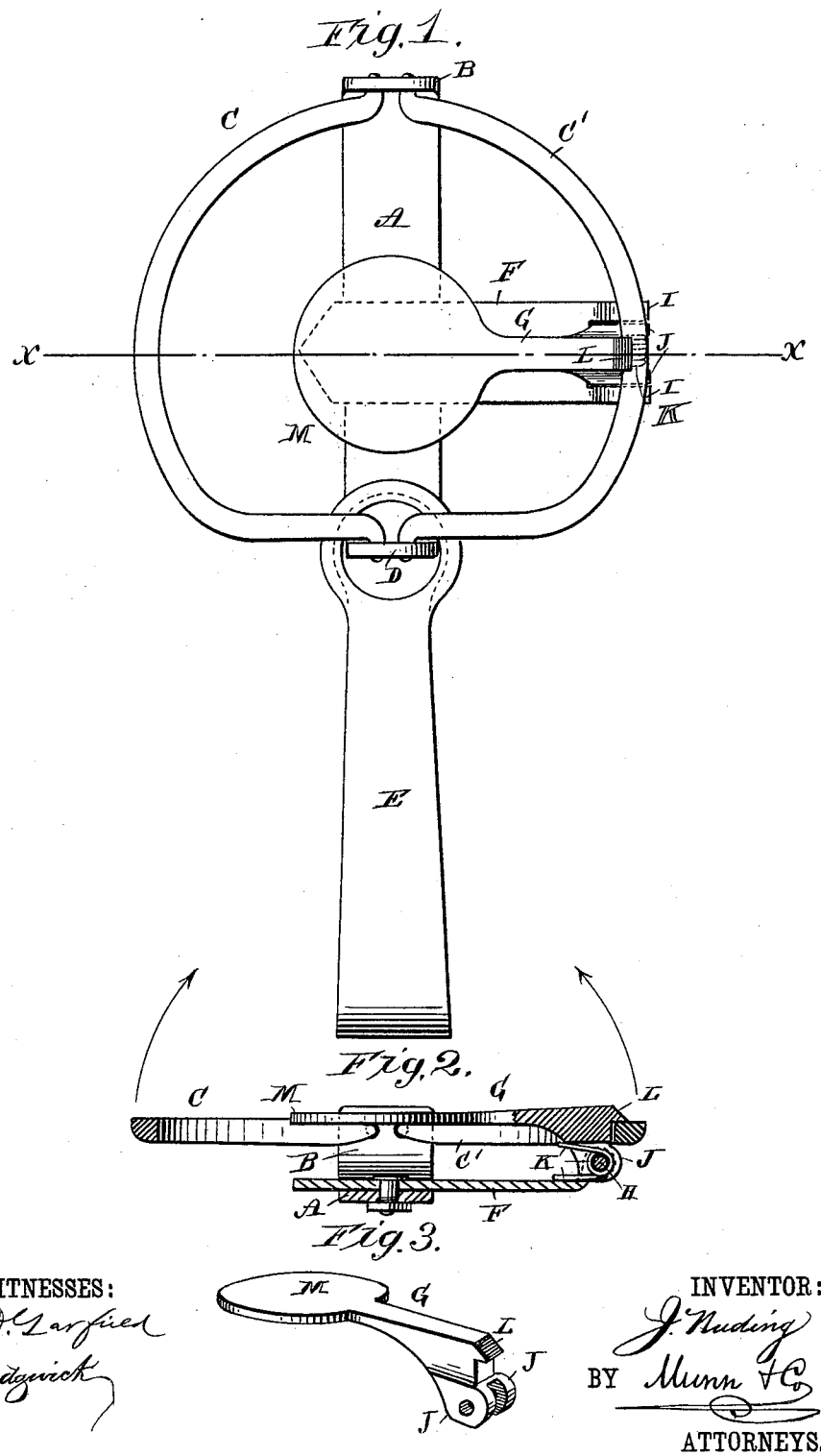

JOHN NUDING, OF KLOEPPEL, DAKOTA TERRITORY.

ANIMAL-TRAP.

SPECIFICATION forming part of Letters Patent No. 366,866, dated July 19, 1887.

Application filed April 18, 1886. Serial No. 235,227. (No model.)

*To all whom it may concern:*

Be it known that I, JOHN NUDING, of Kloeppel, in the county of Richland, Dakota Territory, have invented new and useful Improvements in Animal-Traps, of which the following is a full, clear, and exact description.

The invention relates to spring-jaw traps in which the trigger is tripped by the animal attacking the bait on the trigger-plate; and the object of the invention is to improve the construction of animal-traps of this character.

Reference is to be had to the accompanying drawings, forming a part of this specification, in which similar letters of reference indicate corresponding parts in all the figures.

Figure 1 is a plan view of an ordinary spring-jaw trap to which my improvement has been applied. Fig. 2 is a transverse section on the line x x, Fig. 1; and Fig. 3 is a view of the trigger detached.

In spring-jaw traps of the ordinary construction the pivoted trigger is unsupported, and when the trap is not set the forward end or bait-plate of the trigger falls to the bottom of the trap, and must be raised by the person setting the trap to be engaged by one of the jaws, and as its tendency is to swing downward on its pivot considerable trouble is experienced in the action of setting the trap. To remedy this I provide a yielding support beneath the trigger to hold the same in a raised position, so that as the jaw on the trigger side of the trap descends it will be automatically engaged by a shoulder on the said trigger and held firmly until the trigger is depressed by the animal.

The base plate or bar A of the trap is formed with an upward extension, B, at its forward end, in which projection B the forward pivots of the jaws C C' are inserted, the rear pivots of the said jaws being journaled in the upwardly-extending short standard D, formed upon or secured to the rear end of the base-plate A. A spring-handle, E, is swiveled to the standard D, its upper member serving to close the jaws C C'.

Projecting laterally from the base-plate A at about its center is a plate or bar, F, in the outer end of which the trigger G is pivoted by means of a pivot, H, passed through the outer slotted end, I, of the plate F, and through the lugs J J, formed on the outer end of the trigger.

To support the trigger G in the raised position I provide a coiled spring, K, surrounding the pivot H between the two lugs J on the said trigger, one end of the spring pressing downward on the plate F and the other end pressing upward against the under surface of the trigger G. On the outer end of the trigger G, above the lugs J J, there is formed an outwardly-extending shoulder, L, beveled on its upper surface.

When the spring-handle E is depressed by the person setting the trap and the jaws C C' are allowed to descend or are caused to do so by the operator, the jaw C' strikes the shoulder L on the trigger G, causing the said trigger to swing downward on its pivot H sufficiently to allow the said jaw to pass, whereupon the action of the spring K will press the trigger upward to cause the shoulder L thereon to engage the said jaw C' and hold the same.

It will be understood that the spring K will be of such a strength as to support the weight of the trigger and hold the same in the raised position, but not sufficient to resist a slight pressure by the animal on the bait-plate M of said trigger.

In the ordinary trap, wherein the trigger is allowed to swing downward, the operation of setting the trap necessitates lifting the said trigger, so that its rear portion is engaged by the jaw, and this often results in the fingers of the operator being caught in the jaws and injured. My improved trap may be set without the operator touching the trigger or passing his fingers between the jaws, and may be set by a person in cold weather without removing his gloves or mittens, which is difficult of accomplishment in traps of the ordinary construction.

With the exception of the trigger and its spring, all the parts of my improved trap are or may be of the ordinary construction.

I do not limit myself in respect to the form or arrangement of the spring, as it is evident that it could be arranged differently from the manner shown without departing from the spirit of my invention.

Having thus described my invention, what I claim as new, and desire to secure by Letters Patent, is—

The combination, in an animal-trap having spring-jaws, of a pivoted trigger, G, formed with beveled shoulder L, for engaging one of said jaws, and a spiral spring, K, surrounding the pivot of said trigger and acting to normally hold the trigger in the raised position, substantially as shown and described.

JOHN NUDING.

Witnesses:
ANTON GAUKLER,
LEONHARD FUNK.